Sept. 13, 1949. R. L. F. McDONALD 2,482,018
GOLF BAG CART
Filed May 26, 1947

INVENTOR.
ROBERT LOUIS F. McDONALD
BY
ATTORNEY

Patented Sept. 13, 1949

2,482,018

UNITED STATES PATENT OFFICE 2,482,018

GOLF BAG CART

Robert Louis F. McDonald, Rochester, N. Y., assignor to R. L. McDonald Company, Rochester, N. Y., a firm Application May 26, 1947, Serial No. 750,389

3 Claims. (Cl. 280—53)

The present invention relates to hand carts for transporting golf bags. Such carts relieve the golfer of the burden of carrying his golf clubs and obviate the need for a caddie.

One object of the invention is to provide a cart of this character which will be simpler in construction and cheaper to manufacture than previous types of such carts.

Another object of the invention is to provide a cart of this character which can be quickly and easily disassembled or knocked down, so that it can be readily stored in a club-house locker or in the trunk of the golfer's automobile.

A further object of the invention is to provide a cart of the character described which is so built that it will have stability in standing position and yet will require practically no effort to pull or push it.

Other objects of the invention will be apparent hereinafter from the specification and from the recital of the appended claims.

The cart shown comprises a handle 10 and a wheeled base 11.

Figure 4:
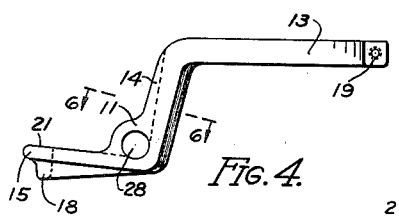
Fig. 4 is a side elevation of the base of the cart without its wheels and with the handle detached therefrom.
Figure 6:
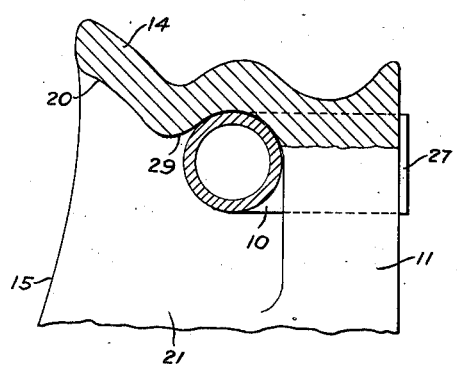
Fig. 6 is a fragmentary section on the line 6—6 of Fig. 4 on a considerably enlarged scale, showing how each arm of the handle is mounted in the base.
Figure 3:
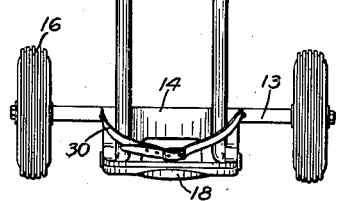
Fig. 3 is a front elevation of the cart.

The base is a single casting, preferably made of aluminum. It may, however, be made of cast-iron, a steel forging or stamping, or of plastic material, or be a die-casting, or it may be made, also, of machined or formed sections. It has two arms 13 which project rearwardly and laterally from the top of a depending skirt portion 14, and it has a shelf or seat 15 which projects forwardly from the bottom of the skirt portion 14. The top surface of the seat 15 is, therefore, in a plane offset below the plane of the upper surface of the arms 13, as clearly shown in Figs. 1, 3 and 4. The skirt portion 14 has a concave front face 20 (Fig. 6) to fit the contour of a conventional golf bag B and the top face 21 of the shelf 15 forms a seat for the bottom of the bag.

The wheels 16 of the cart are mounted on studs 17 which thread into holes 19 in the extremities of the arms 13. The underside of the shelf or seat 15 is formed to provide a foot or rest 18. This constitutes a third place of contact of the cart with the ground when the cart is in standing position, as shown in full lines in Fig. 1, the other two places of contact being provided by the wheels 16.

The handle 10 is made of a single piece of steel tubing bent into a general U-shape and having its legs 26 connected together near their upper ends by a brace or cross-piece 25. The legs 26 of the handle are bent outwardly at their bottom, free ends, as denoted at 27; and these ends 27 are adapted to be inserted into holes 28 provided at opposite sides of the skirt portion 14 of the base, to connect the handle with the base.

To insert the ends 27 of the handle into the holes 28, the handle is placed with the legs 26 substantially flat against the upper surface 21 of the base and the two legs 26 of the handle are sprung sufficiently together to allow of the insertion of their ends 27 into the holes 28. Then the legs are released and the handle is swung upwardly to the position shown in Figs. 1, 2, 3 and 6 where the legs 26 of the handle seat in the recesses 29 formed in the skirt portion 14 and are locked in position by the lateral boundaries of these recesses. To remove the handle 10 from the cart, all that is required is to swing the handle down again until its legs 26 are flat against the face 21 of shelf 15, and then to spring the legs together sufficiently to withdraw their ends 27 from the holes 28 of the base.

For holding a golf bag B on the cart, two straps 30 and 31 may be provided. The strap 30 has its ends riveted or otherwise suitably fastened to the base 11, while the strap 31 has its ends looped around and secured to the legs 26 of the handle 10 just above the bar 25.

The handle is bent rearwardly and upwardly just above the bar 25 at a point just below the top of the conventional bag B. This provides a rearwardly extending portion which will clear the golf clubs C, that may be carried in the bag B, both when the cart is in standing position and when it is in pulling or pushing position. The bight portion 32 of the handle 10 serves as a grip by which the cart may be pulled or pushed. The top surface 21 of the base is a generally plane surface that is inclined downwardly from front to rear when the cart is in its standing position shown in Fig. 1; and the recesses 20 and 29 in the skirt 14 are inclined rearwardly from bottom to top to extend substantially perpendicular to plane 21. Thus, when the base of the golf bag is placed on the seat 15 and the cart is in standing position, the bag will incline rearwardly; and the center of gravity of cart and bag will lie between the place of contact of rest 18 and the points of contact of wheels 16 with the ground as denoted at 22. This will cause the cart to rest firmly on its wheels 16 and foot 18.

Figure 1:
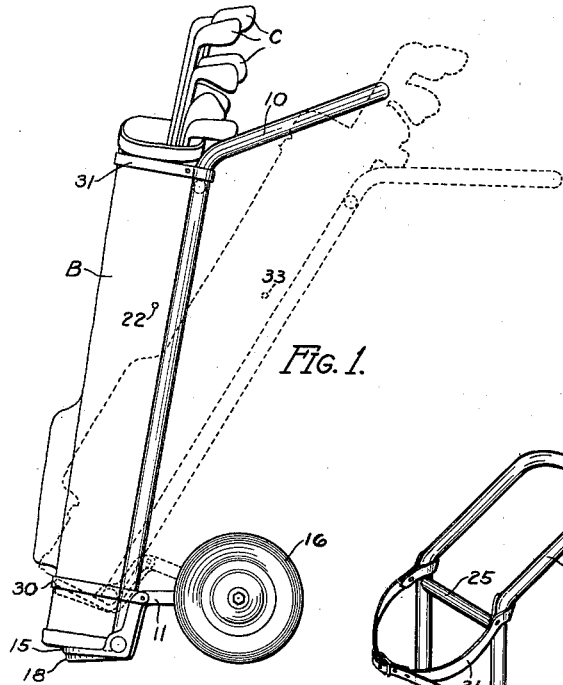
Fig. 1 is a side elevation of a cart constructed according to a present preferred embodiment of the invention and having a golf bag secured thereon, the cart and bag being shown in full lines in the standing position of the cart and in dotted lines in the position which the cart occupies when it is being pulled or pushed.
Figure 2:
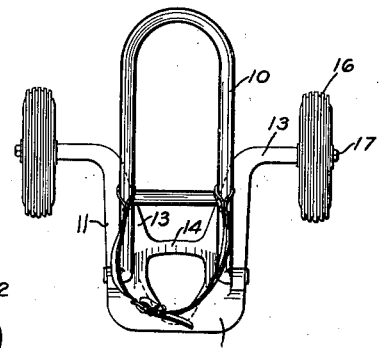
Fig. 2 is a plan view of the cart itself.
Figure 5:
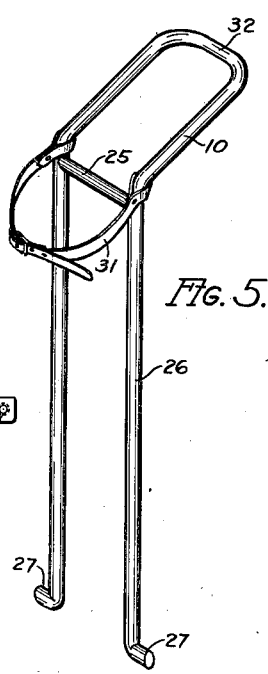
Fig. 5 is a perspective view of the detachable handle.

For pulling or pushing the cart, it is tilted to the dotted line position shown in Fig. 1 so that the weight is carried wholly by the wheels 16. The cart is so proportioned that the center of gravity of cart and bag then lies approximately above the axis of the wheels 16, as denoted at 33. This means that very little effort or exertion will be required to push or pull the cart even though the golf bag B which is mounted thereon be filled with clubs.

One of the principal advantages of the present structure is the detachability of the handle 10. This permits of disassembling the handle from the base of the cart and of putting the two parts of the cart in a golf house locker or in the trunk portion of an ordinary automobile. The golf carts, which have heretofore been built, have had the handle rigid with the base or carriage and it has been impossible to store them in an ordinary club-house locker, and difficult to put them into an ordinary automobile trunk space.

Another feature of the invention is that basically the cart is made of two parts, the handle and the carriage. Thus, it is simple and cheap in construction, and there is nothing to get out of order.

Further features are the inclination of the seating surface 21 and the provision of the rest 18 so that the cart will be stable when in standing position. Still a further feature resulting from this structure is that the center of gravity in rolling position is approximately above the wheel axis, so that it is easy to push or pull the cart along.

While the invention has been described in connection with a particular embodiment thereof, it will be understood that it is capable of further modification, and this application is intended to cover any uses, or adaptations of the invention following, in general, the principles of the invention and including such departures from the present disclosure as come within known or customary practice in the art to which the invention pertains and as may be applied to the essential features herein before set forth and as fall within the scope of the invention or the limits of the appended claims.

Having thus described my invention, what I claim is:

1. A cart for golf bags comprising a rigid base which has a skirt portion, a pair of arms secured to and projecting rearwardly from the top of the skirt portion, and a shelf secured to and projecting forwardly from the bottom of the skirt portion, a pair of wheels mounted on said arms at opposite sides of the skirt portion, said shelf having a foot formed on the underside thereof which constitutes with said wheels support for said cart when it is in standing position, said shelf having an upper surface adapted to support a golf bag and which is inclined downwardly from front to rear, and said skirt portion having a surface against which a side of the bag may rest and which extends substantially perpendicular to the shelf, said base having aligned holes therein at the bottom of its skirt portion and a U-shaped handle made of tubular material which can be sprung and having legs whose free ends are turned outwardly, said ends being rotatably and detachably engaged in said holes, and means on the skirt portion of said base which engage the legs of said handle to lock the free ends of said handle in said holes when said handle is in operating position.

2. A cart for golf bags comprising a rigid base having aligned holes provided at opposite sides thereof and a skirt portion at and secured to one end thereof, wheels on which the base is mounted, a U-shaped tubular handle having legs whose free ends are turned outwardly to engage detachably in the aligned holes of the base and means protruding from said skirt portion of the base to engage the insides of the legs of the handle, when the handle is in operative position, to prevent retraction of the ends of the handle from the holes in the base until the handle is swung down on the base out of operative position.

3. A cart for golf bags comprising a rigid one-piece base casting which has a skirt portion, a pair of arms secured to and projecting rearwardly from the top of the skirt portion, and a shelf secured to and projecting forwardly from the bottom of the skirt portion, said shelf having a plane upper surface forming a rest for the golf bag and which is inclined downwardly from front to rear, a pair of wheels mounted on said arms at opposite sides of the skirt portion, to rotate on an axis lying above the plane of said shelf, said shelf having a foot formed on the underside thereof which is adapted with said wheels to provide support for said cart when it is in standing position, said base having aligned holes in opposite sides thereof, and a U-shaped handle having legs whose free ends are turned outwardly to be engaged detachably and rotatably in said holes, said skirt portion having a surface against which a side of the bag may rest and which extends substantially perpendicular to the shelf, and having two spaced recesses formed therein to receive the legs of said handle to hold the said free ends in said holes when the handle is in operative position.

ROBERT LOUIS F. McDONALD.

REFERENCES CITED

The following references are of record in the file of this patent:

UNITED STATES PATENTS

| Number | Name | Date |
|---|---|---|
| 1,557,263 | Millen | Oct. 13, 1925 |
| 1,751,902 | Brown | Mar. 25, 1930 |
| 2,073,114 | Martin et al. | Mar. 9, 1937 |
| 2,368,752 | Duis | Feb. 6, 1945 |

FOREIGN PATENTS

| Number | Country | Date |
|---|---|---|
| 152,538 | Austria | Feb. 25, 1938 |